United States Patent [19]
Castonguay et al.

[11] Patent Number: 6,151,392
[45] Date of Patent: Nov. 21, 2000

[54] TELECOMMUNICATIONS PROTECTOR PANEL CONNECTOR ASSEMBLY

[75] Inventors: Guy Castonguay, Ft. Worth; Josh M. Wilken, N. Richland Hills, both of Tex.

[73] Assignee: Siecor Operations, LLC, Hickory, N.C.

[21] Appl. No.: 09/167,107

[22] Filed: Oct. 6, 1998

[51] Int. Cl.[7] .................................................. H04M 1/00
[52] U.S. Cl. .......................................... 379/437; 379/438
[58] Field of Search .................................. 379/451, 412, 379/437, 438; 439/922; 361/824

[56] References Cited

U.S. PATENT DOCUMENTS

| | | | |
|---|---|---|---|
| 3,760,328 | 9/1973 | Georgopulos | 379/27 |
| 3,761,842 | 9/1973 | Gandrud | 333/1 |
| 3,947,732 | 3/1976 | Cwirzen | 361/826 |
| 4,538,868 | 9/1985 | Cruise et al. | 439/131 |
| 5,961,354 | 10/1999 | Hashim | 439/676 |

Primary Examiner—Jack Chiang
Assistant Examiner—Hector Agdeppa

[57] ABSTRACT

A protector panel having a plurality of parallel rows of socket groups that include a plurality of receptacles for receiving pins of plug-in excess voltage modules. The socket groups on adjacent rows are offset such that they are oriented relative to one another such that each incoming tip receptacle of each of the socket groups in one row is more closely spaced to one of the other receptacles rather than the incoming ring receptacle of the adjacent row. The socket groups within one row may also be rotated relative to socket groups in an adjacent row. On the back of the protector panel, a plurality of pins are positioned to communicate with the socket groups. Wire pairs lead to and wrap around each of the pins. The wires are twisted about one another to a location near the pins at which point a first wire and a second wire of the wire pairs are separated to attach to their respective pins, wherein the number of twists per liner increment varies from one pair to another wire pair in close proximity.

26 Claims, 3 Drawing Sheets

TELECOMMUNICATIONS PROTECTOR PANEL CONNECTOR ASSEMBLY

TECHNICAL FIELD

This invention relates to a protector panel assembly for telecommunications connections. More specifically, the invention relates to a protector panel configuration whereby crosstalk between cables is reduced or eliminated.

BACKGROUND OF THE INVENTION

Telecommunications lines, within for example, a telephone system or cable TV system, must be protected from high voltages and surge currents that may occur on the lines. Such currents may damage telecommunications equipment to which the lines are coupled. Each telecommunications line comprises a twisted-pair of wires, and in telephone lines, one is for tip and one is for ring. For business users, normally, each twisted-pair of wires is extended into a protector panel or connector block assembly, which is capable of handling a number of lines. A plug-in excess voltage module is utilized at the protector panel to connect each pair of incoming wires to lines leading to the subscribers equipment. The module is used to protect the equipment that is connected to the incoming telecommunications line from high voltages and current surges occurring on the line.

Numerous plug-in excess voltage modules are typically plugged into receptacles within a protector panel. Due to space limitations, protector panels are constructed to occupy a minimal amount of space while servicing a large number of plug-in excess voltage modules. Such a configuration has been acceptable until such wires were required to carry high frequency communications. One standard known as Category 5 is employed to determine if equipment is capable of handling high frequency communications.

A typical telephone line operates at 300 Hz to 3.5 KHz to transmit an analog voice. The trend is to move out of the voice band up to frequencies as high as 30 MHz for digital communication. A difficulty encountered through the use of high frequencies is that of crosstalk. Crosstalk is unwanted signal coupling between two pairs of wires. Typically, crosstalk occurs between wires that are physically close to one another. The strength of the interference or crosstalk is directly proportional to the square of the distance. For example, in a protector panel servicing 50 lines, crosstalk is likely to occur due to the number of wires crowded into the limited space on the protector panel. Therefore, an improved protector panel assembly is needed to effectively transmit data at higher frequencies without interfering crosstalk.

DISCLOSURE OF THE INVENTION

The protector panel of the present invention includes a plurality of parallel rows of socket groups. The socket groups include a plurality of receptacles for receiving pins of plug-in excess voltage modules. Each socket group includes an incoming tip receptacle and an outgoing tip receptacle for connection to incoming and outgoing tip lines. Each socket group additionally includes an incoming ring receptacle and an outgoing ring receptacle for connection to incoming and outgoing ring lines. A fifth receptacle is employed for ground.

The socket groups on adjacent rows are oriented relative to one another such that each incoming tip receptacle of each of the socket groups in one row is more closely spaced to one of the other receptacles rather than the incoming ring receptacle of the adjacent row. For example, the socket groups in adjacent rows are arranged such that an incoming tip receptacle in one row is closer to an outgoing ring in an adjacent row than the other receptacles. Additionally, the socket groups within one row may be rotated relative to socket groups in an adjacent row.

The plurality of receptacles in each socket group receives pins of plug-in excess voltage modules.

Each receptacle has a pin on its opposite end which extends through the protector panel and protrudes from the back side of the protector panel. Wires from the outside telecommunications cable lead to and wrap around certain of the pins, referred to herein as incoming pins. Wires from the subscriber equipment lead to wrap around the remainder of the pins, referred to herein as outgoing pins. Continuity is established from outside wires, through the incoming pins and the joined receptacles, through the plug-in excess voltage modules to outgoing receptacles and their pins, and from there to the outgoing wires leading to the subscriber equipment. The wires are twisted about one another as they pass along the back of the protector panel to a location near the pins. At that point, a first wire and a second wire of the wire pairs are separated to attach to their respective pins. Preferably, the wire pairs are twisted in a manner resulting in between 3.25 twists per inch and 1 twist per inch. A shield may be employed around bundles of the twisted-pairs along the back of the protector panel. To further decrease crosstalk between wires, wire pairs are provided wherein the number of twists per linear increment varies from one pair to another within an individual shield.

DETAILED DESCRIPTION OF THE INVENTION

Figure 1:
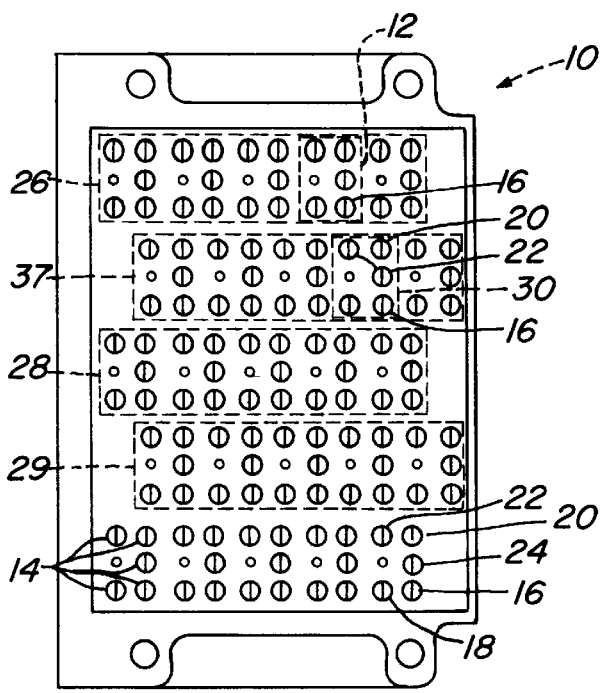
FIG. 1 is a front elevation view of a protector panel made up of a plurality of socket groups.

Referring now to FIG. 1, a protector panel is designated generally 10. The protector panel 10 includes a plurality of socket groups 12. Each socket group 12 is made up of a plurality of receptacles 14, five in the embodiment shown. Generally, two are for incoming lines (equipment lines), two are for outgoing lines (outside plant input/cable), and one is for ground. In the preferred embodiment, each socket group 12 has an incoming tip receptacle 16 and an outgoing tip receptacle 18 for connection to incoming and outgoing tip lines. Additionally, each socket group 12 has an incoming ring receptacle 20 and an outgoing ring receptacle 22 for connection to incoming and outgoing ring lines. Further, as is shown in FIG. 1, each socket group 12 may also include a fifth receptacle or ground receptacle 24.

Figure 2:
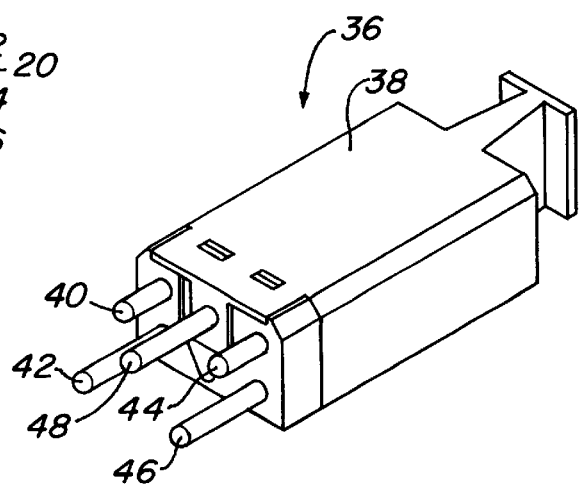
FIG. 2 is an enlarged perspective view of a plug-in excess voltage module for insertion into the panel of FIG. 1.
Figure 7:
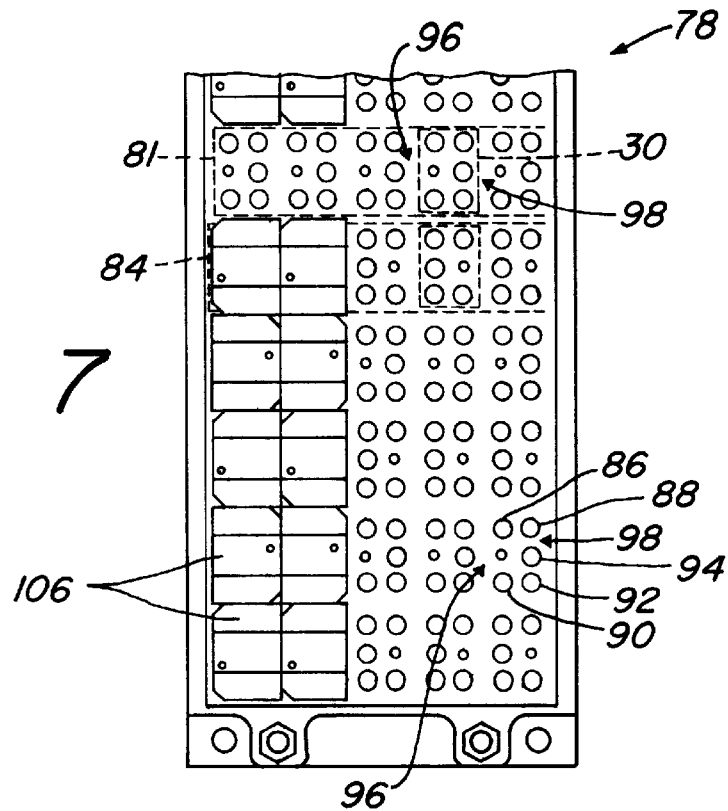
FIG. 7 is an elevation view of an alternate embodiment of a protector panel in accordance with this invention.
Figure 8:
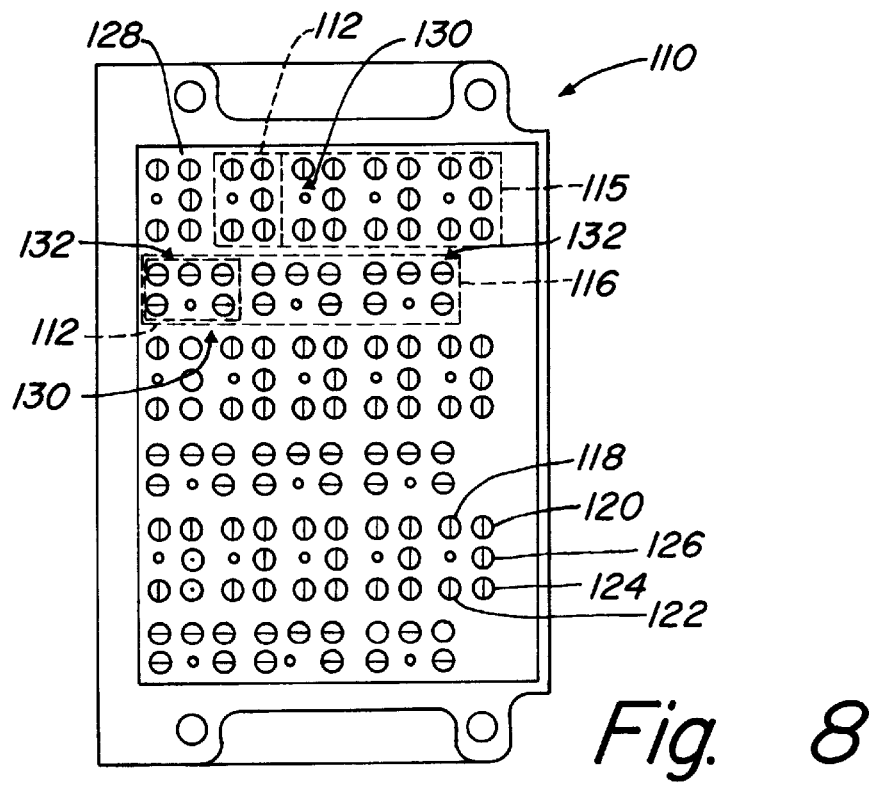
FIG. 8 is an elevation view of an alternate embodiment of a protector panel in accordance with this invention.

The socket groups 12 are preferably arranged in parallel rows, for example first row 26, second row 27, third row 28, and fourth row 29, which extend across the width of protector panel 10. However, any number of rows may be used. While the rows are depicted close together in the figures, the rows may also have an increased spacing. Rows 26, 27 are preferably parallel to each other, extending perpendicular to the longer dimension or length of panel 10. An electrical loop is formed between the incoming and outgoing tip receptacles 16, 18 and the plug-in module 38 (FIG. 2). Similarly an electrical loop is formed between the incoming and outgoing ring receptacles 20, 22 and the plug-module 38. Crosstalk is more likely to occur when the loop of one group is closely spaced and aligned with a loop of an adjacent row. The socket groups 12 of FIG. 1 and the alternate embodiments of FIGS. 7 and 8 are arranged to prevent loops of adjacent rows from being aligned with each other.

In FIG. 1, to reduce crosstalk between a row 26 and an adjacent row 27, each incoming tip receptacle 16 of each socket group 12 in row 26 is more closely spaced to the other receptacles 14 of adjacent row 27 rather than to the incoming ring receptacle 20 of the adjacent row 27. For example, incoming tip receptacle 16 of the top row 26 is closer to outgoing ring 22 than incoming ring 20 of second row 27.

In this embodiment, socket group receptacles 12 in top row 26 are preferably laterally offset from socket groups 30 in second row 27 by a distance equal to the distance between incoming and outgoing receptacle 14 within each socket group 12. Even numbered rows 26, 28 extend closer to the left margin of panel 10 than odd numbered rows 29. Odd numbered rows 27, 29 extend closer to the right margin of panel 10 than the even numbered rows 28. Each even numbered row 26, 28 thus has the same width as each odd numbered row 27, 29 but is offset from adjacent rows. Stated another way, socket groups 12 in even rows 26, 28 are offset from socket groups 30 in odd numbered rows 27, 29 such that a line drawn perpendicular to rows 26 and 27 and passing through a selected incoming tip receptacle 16 in all of the even numbered rows 26, 28 will not pass through any of the incoming tip receptacles 16 in any of the odd numbered rows 27, 29.

Figure 3:
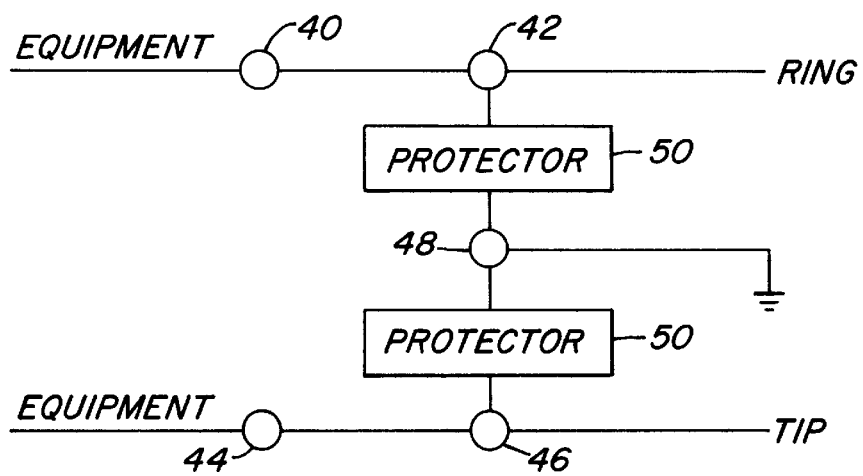
FIG. 3 is a schematic circuit diagram of circuitry in the plug-in excess voltage module of FIG. 2.

Plug-in excess voltage module 36 of a type for installation in panel 10 is illustrated in FIGS. 2 and 3. Module 36 is conventional and is made up of a body 38 that houses the electronics shown schematically in FIG. 3. Protruding from body 38 is a plurality of pins. A five-pin type module is shown in FIG. 2. The five-pin type module has an incoming tip pin 40, an outgoing tip pin 42, an incoming ring pin 44, outgoing ring pin 46, and a ground pin 48. The pins of module 36 correspond to the socket group receptacles 14 of the protector panel shown in FIG. 1. One example of such protector modules is the C-303™ solid-state overvoltage protector modules manufactured by Siecor, 489 Siecor Park, P.O. Box 489, Hickory, N.C. 28603-0489. The five-pin protector modules are designed for use with standard five-pin type connectors used primarily in building entrance terminals, but may also be used in central office applications as well.

When inserted into connector sockets such as those found in socket groups 12 (FIG. 1), modules 36 provide the following connection for each cable pair: tip and ring to the outside cable, tip and ring to the building equipment or central office equipment, and protection ground that also acts as a polarization pin. Protectors 50 (FIG. 3) are provided within plug-in excess voltage module 36. Protector 50 may be a solid state component or a gas tube that resets between the tip and ground and ring and ground. Protector 50 shunts to ground briefly to compensate for fault currents, overloads, or unbalanced loads that result in sneak currents.

Figure 4:
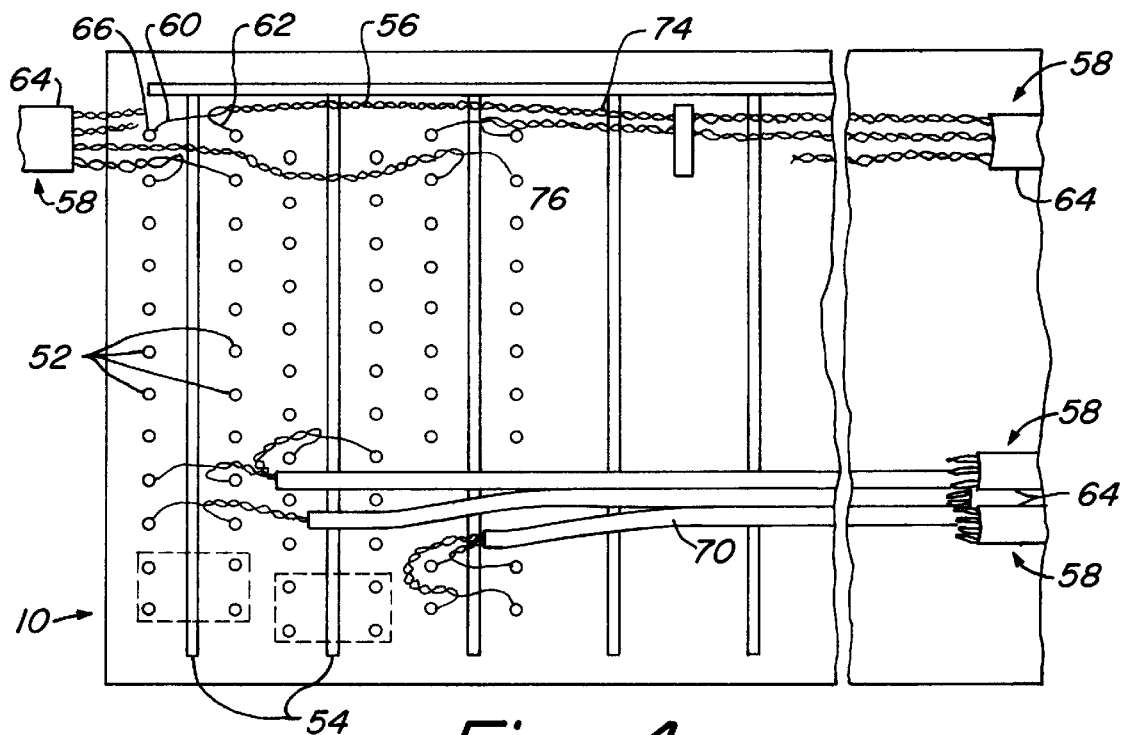
FIG. 4 is a back view of the protector panel of FIG. 1.

The back side of protector panel 10 is shown in FIG. 4. Each receptacle 14 on the front side (FIG. 1), except for ground receptacle 24, leads to a pin 52 extending from the rear of panel 10. Rather than connecting to a pin, each ground receptacle 24 (FIG. 1) is connected to a ground bar 54. Ground bars 54 are positioned between groups of pins 52 and extend the lengths of the rows 26–29. A plurality of twisted wire pairs 56 extend from an end of bundles of wires, referred to herein as cable 58. For example, twenty five pairs 56, each having a tip or first wire 60 twisted with a ring or second wire 62, may be included in cable 58. Usually, cable 58 will have a jacket 64 that terminates at panel 10. Some of the cables 58 connect to an outside telecommunications network, while other of the cables 58 connect to subscriber equipment within the facility.

In FIG. 1, a first wire 60 is shown affixed to a pin, for example, first pin 66. A second wire 62 is affixed to a pin, for example, second pin 68. The twisted pairs of wires 56 remain twisted as they pass along the back of panel 10. The wire pairs 56 remain twisted until they are very close to each pin 52 or ground bar 54. Furthermore, sheaths 70 may be employed to enclose smaller groups of wires 56 as they pass along the back of panel 10 near pins 52. In the preferred embodiment shown in FIG. 4, sheaths 70 are shown, each extending from the jacket 64 of bundle 58 to near the pins 52 to which the wires 56 will be secured. In FIG. 4, sheaths 70 are shown containing two twisted pairs although any number of pairs could be used. Moreover, sheaths 70 may be metallic, plastic, or any other suitable material.

Figure 5:
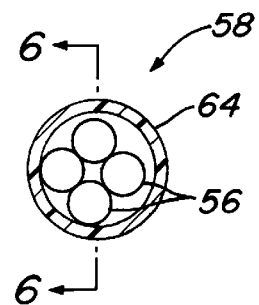
FIG. 5 is a cross-sectional view of a sheath that may be inserted over bundles of the wires along the back of the protector panel of FIG. 1.
Figure 6:
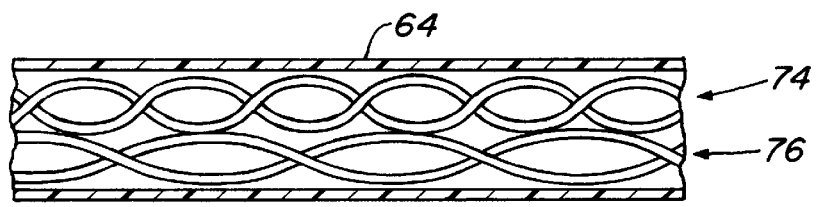
FIG. 6 is a sectional view of the wire sheath of FIG. 5 taken along line 6—6 of FIG. 5.

It has also been found to be advantageous to vary the twist density or vary the number of twists per linear increment of closely spaced twisted wire pairs 56. For example, it can be seen that first wire pair 74 (FIGS. 4 and 6) is more tightly twisted or has a greater number of twists per linear increment than does second wire pair 76 (FIGS. 4 and 6). Varying the number of wire twists also aids in reducing crosstalk in wire pairs traversing the back surface of protector panel 10 and also in wire pairs carried within sheath 70 as shown in FIGS. 5 and 6. Preferably, the maximum number of twists is approximately 3.25 per inch and a minimum twist density is 1 twist per inch.

Referring now to an alternate embodiment in FIG. 7, protector panel 78 has a plurality of socket groups 80 thereon. Socket groups 80 are arranged in rows, for example, odd numbered rows 81 (from the top of panel 78) and even numbered or adjacent rows 84. Socket groups 80 are preferably made up of five receptacles including an outgoing and incoming ring receptacle 86, 88, an outgoing and incoming tip receptacle 90, 92, and a ground receptacle 94. In the arrangement shown in FIG. 7, socket groups 80 have an outgoing side 96 and an incoming side 98. Within odd rows 81 of FIG. 7, socket groups 80 have an outgoing side 96 on the left side of the footprint of socket group 80 and an incoming side 98 on the right side of the footprint of socket group 80. The plurality of socket groups 80 in adjacent even rows 84 have their footprints reversed with respect to the odd rows 81; the outgoing side 96 is on the right side and the incoming side 98 is on the left. Therefore, the footprint of socket groups 80 in odd numbered rows 81 are rotated 180° with respect to the footprints of socket groups 80 in even numbered rows 84. Outgoing and incoming tip receptacles 90, 92 of odd numbered rows 81 are located next to outgoing and incoming tip receptacles 90, 92 of even numbered rows 84. Also shown in FIG. 7, is a plurality of plug-in excess voltage modules 106 already inserted into the sockets of socket groups 80.

Alternately, adjacent rows of socket groups may have socket group footprints that are rotated 90° with respect to one another (FIG. 8). Referring now to the alternate embodiment of FIG. 8, protector panel 110 has a plurality of socket groups 112 thereon. Socket groups 112 are arranged in rows, for example, odd numbered rows 115 (from the top of panel 110) and adjacent or even row numbered rows 116. Socket groups 112 are made up of an outgoing ring receptacle 118, an incoming ring receptacle 120, an outgoing tip receptacle 122, and an incoming tip receptacle 124. Socket groups 112 have a fifth receptacle or ground receptacle 126. Therefore, socket groups 112 have an outgoing side 128 and an incoming side 130. Within even numbered rows 116 of FIG. 8, socket groups 112 have an outgoing side 128 on the bottom side of the footprint of socket group 113 and an incoming side 132 on the top side of the footprint of socket group 113. In adjacent odd numbered rows 115 the outgoing side 128 of the footprint of socket group 112 faces to the left, but may also face to the right.

The outgoing side 128 of the footprint of socket group 112 in even numbered row 116 faces downward. Therefore, the footprint of socket groups 112 in odd numbered row 115 are rotated 90° with respect to the footprints of socket groups 112 in even numbered rows 116 such that outgoing sides 128 are oriented in different directions.

The invention has substantial advantages. By modifying the arrangement of socket groups on a protector panel, crosstalk or interference between wire pairs is minimized. By utilizing an arrangement of socket groups on a protector panel that minimizes interference or crosstalk, the noise levels at high frequencies is reduced, and hence signals may be transmitted at these higher frequencies. Additionally, crosstalk and interference may be further reduced on the backs of protector panels by varying the twist densities of adjacent wire pairs and by additional shielding on a protector panel.

While the invention is shown in only one of its forms, it should be apparent to those skilled in the art that it not so limited, but is susceptible to various changes without departing from the scope of the invention.

We claim:

1. A protector panel for telecommunications lines comprising:
   at least one first row and at least one adjacent row of a plurality of socket groups, wherein each of said socket groups comprises a plurality of receptacles for receiving pins of a plug-in excess voltage module, wherein each of the socket groups has an incoming tip receptacle and an outgoing tip receptacle for connection to incoming and outgoing tip lines, respectively, and an incoming ring receptacle and an outgoing ring receptacle for connection to incoming and outgoing ring lines, respectively; and
   wherein said socket groups in said first row are oriented relative to said socket groups in said at least one adjacent row such that each incoming tip receptacle of each of the socket groups in said first row is more closely spaced to one of the other receptacles other than the incoming ring receptacles of said socket groups of said at least one adjacent row.

2. The protector panel according to claim 1 wherein:
   said socket groups in said first row are offset from said socket groups in said at least one adjacent row such that each incoming tip receptacle in said first row is closer to an outgoing ring receptacle in said adjacent row than any other receptacles in said adjacent row.

3. The protector panel according to claim 1 wherein:
   said socket groups in said first row are offset from said socket groups in said at least one adjacent row such that a line perpendicular to said rows and passing through an incoming tip receptacle in said first row will not pass through an incoming tip receptacle in said adjacent row.

4. The protector panel according to claim 1 wherein:
   said socket groups within said first row are rotated relative to socket groups within said adjacent row.

5. The protector panel according to claim 1 further comprising a third row of socket groups, said at least one adjacent row being located between and offset from said first row and said third row such that a line perpendicular to said rows and passing through one of said incoming tip receptacles in said first row will not pass through any of said incoming tip receptacles in said at least one adjacent row, but will pass through one of said incoming tip receptacles in said third row.

6. The protector panel according to claim 1 wherein:
   said socket groups in said first row have an outgoing side of pins and an incoming side of pins, said outgoing side of pins on some of said socket groups oriented in a first direction and said socket groups in said at least one adjacent row have an outgoing side oriented in a second direction.

7. The protector panel according to claim 1 further comprising:
   a plurality of pins connected to said socket groups and protruding from a back side of the protector panel; and
   a pair of wires leading to and connected to each pair of said pins, each of the wires being twisted about one another to a point proximate said pair of pins, at which point said wires of said pair are separated to attach to their respective pins, said pair of wires adapted to be connected to the incoming and outgoing tip and ring lines.

8. The protector panel according to claim 7 wherein each of said wires are twisted about one another at a degree of twist between 3.25 twists/inch and one twist/inch.

9. The protector panel according to claim 7 further comprising:
   a jacket surrounding a plurality of said pairs of wires, said jacket terminating at a selected distance from said pins; and
   a plurality of shields, each enclosing at least two of said pairs of wires, but a lesser amount than said jacket, said shields extending from said termination of said jacket at least partially along said back side of said panel from said termination of said jacket to said respective pins for the wires contained therein.

10. A protector panel for telephone wires comprising:
    at least a first, a second, a third, and a fourth parallel row of socket groups, wherein each of said socket groups comprises a plurality of receptacles for receiving pins of a plug-in excess voltage module, wherein each of said socket groups has an incoming tip receptacle and an outgoing tip receptacle for connection to incoming and outgoing tip lines, respectively, and an incoming ring receptacle and an outgoing ring receptacle for connection to incoming and outgoing ring lines, respectively;
    wherein said socket groups in said first row are oriented relative to said socket groups in said second row such that each incoming tip receptacle of each of said socket groups in said first row is more closely spaced to one of said receptacles other than said incoming ring receptacles of said socket groups of said second row; and
    said socket groups in said first and third rows are offset from said socket groups in said second and fourth rows and staggered such that a line perpendicular to said rows and passing through an incoming tip receptacle in said first row will not pass through an incoming tip receptacle in said second and fourth rows, but will pass through an incoming tip receptacle in said third row.

11. The protector panel according to claim 10 further comprising a plurality of pins connected to said socket groups and protruding from a back side of the protector panel; and
 a pair of wires leading to and wrapped around each pair of said pins, each of the wires being twisted about one another to a point proximate said pair of pins, at which point said wires of said pair are separated to attach to their respective pins, said pairs of wires adapted to be connected to the incoming and outgoing tip and ring lines.

12. The protector panel according to claim 11 wherein:
 each of said wires are twisted about one another to a degree of twist between 3.25 twists/inch to one twist/inch.

13. The protector panel according to claim 11 wherein:
 a jacket surrounding a plurality of said pairs of wires, said jacket terminating at a selected distance from said pins; and
 a plurality of shields, each enclosing at least two of said pair of wires, but a lesser amount than said jacket, said shields extending from said termination of said jacket at least partially along said back side of said panel from said termination of said jacket to said respective pins for the wires contained therein.

14. A protector panel for telephone wires comprising:
 a first row and at least one adjacent row of socket groups, wherein each of said socket groups comprises a plurality of receptacles for receiving pins of a plug-in excess voltage module, wherein each of said plurality of receptacles comprises a socket group footprint having an incoming side and an outgoing side; and
 wherein each of the footprints in said first row is rotated with respect to the closest footprint in said at least one adjacent row such that said incoming and outgoing sides are oriented in different directions.

15. The protector panel according to claim 14 wherein each of said socket groups has at least four of said receptacles.

16. The protector panel according to claim 14 wherein:
 all of said footprints of said first row are oriented in a first direction and all of said footprints of said at least one adjacent row are oriented in an opposite direction to said first direction.

17. The protector panel according to claim 14 wherein:
 said incoming and outgoing sides of said footprints of said first row and said second row are rotated 90° with respect to one another.

18. The protector panel according to claim 14 wherein:
 said incoming and outgoing sides of said footprints are rotated 180° with respect to said closest footprints.

19. A protector panel for telephone wires comprising:
 a plurality of parallel rows of socket groups on a front side of said panel, each of said socket groups comprising a plurality of receptacles for receiving prongs of a plug-in excess voltage module;
 a plurality of pins grouped in pairs, said pins being connected to said socket groups and protruding from a back side of said panel; and
 a pair of wires leading to and wrapped around each pair of said pins, each of said wires being twisted about one another to a point proximate said pair of pins, at which point said wires of said pair are separated to attach to their respective pins.

20. The protector panel according to claim 19 further comprising:
 a ground bar extending across the back of said panel for each of said rows; and
 wherein each of said pairs of wires is twisted about one another until said wires are proximate said ground bar associated with their respective pins.

21. The protector panel according to claim 19 wherein:
 each of said pairs of wires has a degree of twist between 3.25 twists/inch and one twist/inch.

22. The protector panel according to claim 19 further comprising:
 a jacket enclosing a plurality of said pairs of wires, said jacket having an end proximate said back of said panel; and
 a plurality of shields each enclosing at least two of said pair of wires, but a lesser amount than said jacket, said shields extending at least partially along said back of said panel from the end of said jacket to the respective pin for the wires contained therein.

23. The protector panel according to claim 22 wherein:
 a number of twists per linear increment of at least one of said pairs of wires, located within each of said shields varies from the number of twists per linear increment of the at least one other pair of wires within said shield.

24. A protector panel for reducing crosstalk in telecommunication lines comprising:
 a first row of a plurality of socket groups, each of the socket groups comprising a plurality of receptacles for receiving pins of a plug-in excess voltage module, the first row of socket groups having a first spacing relative to the protector panel; and
 at least one second row of a plurality of socket groups adjacent the first row, the second row of the plurality of socket groups having a second spacing relative to the protector panel, the spacing of the socket groups in the at least one second row being different from the spacing of the first row.

25. A protector panel for reducing crosstalk in telecommunication lines comprising:
 a first row of a plurality of socket groups, each of the socket groups comprising a plurality of receptacles for receiving pins of a plug-in excess voltage module, each of the socket groups having a first orientation relative to the protector panel; and
 at least one second row of a plurality of socket groups adjacent the first row, each of the socket groups in the second row having a second orientation relative to the protector panel, the orientation of the socket groups in the second row being different from the orientation of the socket groups in the first row.

26. The protector panel according to claim 25 wherein
 each of the socket groups in the first row has an orientation different from an adjacent one of the socket groups in the first row; and
 wherein each of the socket groups in the second row has a orientation different from an adjacent one of the socket groups in the first and the second rows.

* * * * *